April 8, 1930.  R. H. CARPENTER  1,753,693
FOOD STRAINER
Filed March 30, 1927
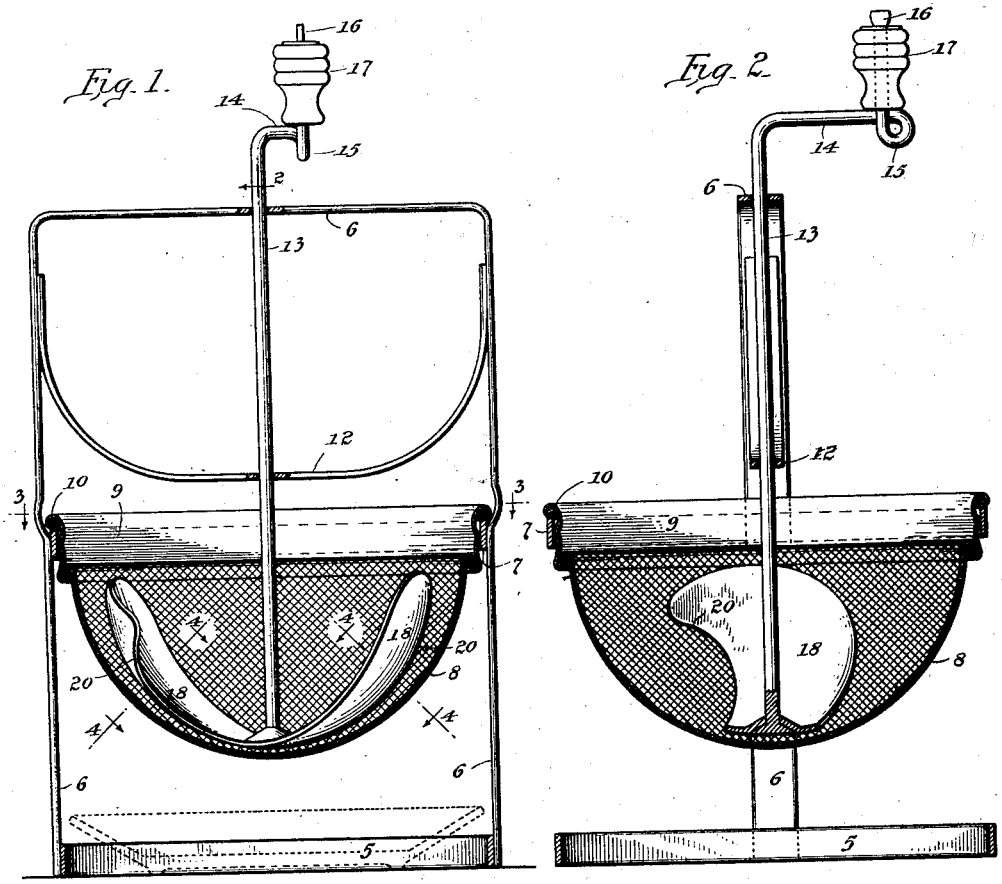
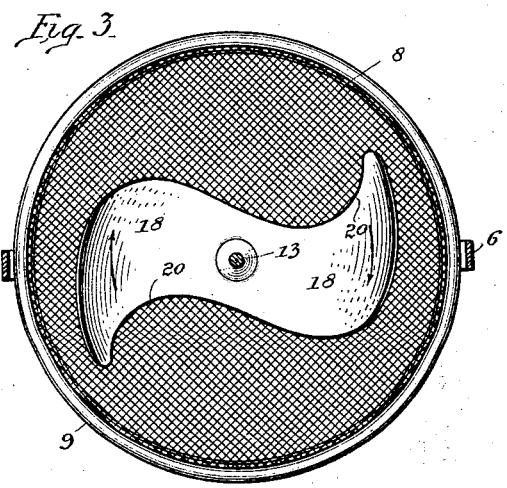
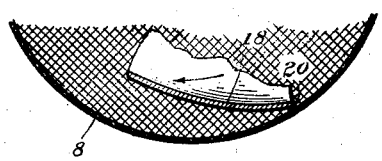
Inventor:
Russell H. Carpenter
By Wd. E. Waldo, Atty.

Patented Apr. 8, 1930

1,753,693

UNITED STATES PATENT OFFICE

RUSSELL H. CARPENTER, OF MADISON, WISCONSIN

FOOD STRAINER

Application filed March 30, 1927. Serial No. 179,590.

My invention relates to improvements in food strainers, and has for its object the provision of an improved construction of this character especially adapted for use in straining infant's and children's food, which is capable of economical manufacture and highly efficient in use.

Another object of the invention is to provide a construction of this character having improved means incorporated therein for removably mounting a strainer sieve whereby the same may be readily removed for cleaning purposes.

Another object of the invention is to provide an improved crank shaft construction especially adapted for use in such machines and by means of which a simple and efficient crank shaft may be economically constructed.

Other objects will appear hereinafter.

In general the objects of the invention are attained by providing a suitable supporting frame of improved and economical construction in which a substantially hemispherical straining sieve is removably mounted. Cooperating with said sieve is a crank shaft provided with a peculiarly shaped blade adapted and arranged to force the food material through said sieve.

The invention consists in the combinations and arrangement of parts hereinafter described and claimed.

The invention will be best understood by reference to the accompanying drawings forming a part of this specification and in which, Fig. 1 is a side view shown partially in section, of a food strainer embodying the invention;

Fig. 2 is a vertical section taken substantially on line 2—2 of Fig. 1;

Fig. 3 is a horizontal section taken substantially on line 3—3 of Fig. 1, and

Fig. 4 is a section taken substantially on either of the lines 4—4 of Fig. 1.

The preferred form of construction as illustrated in the drawings comprises a base member 5 in the form of a ring made from a metal strip secured in ring form to rest, as indicated, on a table top, or the like. An upstanding frame member formed from a single metal strip 6, bent into substantially inverted U-form, is secured to the ring 5, as shown, preferably by spot-welding. An intermediate supporting ring 7 is also secured to the sides of the frame 6 by means of spot-welding, as indicated.

A straining sieve 8 substantially in hemispherical form is removably mounted in the frame thus provided, said sieve being provided at its upper edges with a reinforcing and supporting rim 9 having an outwardly turned supporting bead 10 at its upper edge, said rim 9 being of a size to fit snugly within the ring 7 and said lip 10 being arranged, as shown, to rest upon the top of said ring, the sides of the frame 6 being outwardly bowed to accommodate said lip as shown. By this arrangement the sieve 8 will be firmly supported in the frame and yet may be readily removed when desired for cleaning or replacing.

A brace 12, in the form of a metal strip bent into substantially U-form and having its ends spot-welded to the sides of the frame 6, is extended across the upper portion of said frame, as shown, and a crank shaft 13 is rotatably and slidably mounted, as indicated, in said cross brace and in the top of the frame 6. The crank shaft 13 is preferably formed, as shown, of a single piece of wire having its upper end bent into a crank arm 14, the end of said crank arm being bent to form the eye 15 and to cause the bent end 16 to cross the body 14 of the crank itself, as best shown in Fig. 2.

A handle 17 is loosely mounted, as shown, upon the bent end 16, said handle thus resting against the body of the crank 14, said crank thus serving as a stop and support for said handle, as indicated.

At its lower end the crank shaft 13 carries a blade 18 having two oppositely disposed arms as shown, said blade arms being arranged to form a wedging angle with the sieve 8. As indicated, the rear edges 20 of the arms of the blade 18 are arranged and curved to contact with the bottom and sides of the sieve 8 when said crank shaft is in depressed position, said rear edges 20 of said blade arms being arranged on rearwardly receding curves as shown.

By this arrangement it will be noted that food in the sieve 8 will be forced by the wedging action between the blade arms 18 and the sieve 8 through the meshes of said sieve as the crank shaft 13 is rotated and pressed downwardly. Owing to the rearwardly receding curve of the rear edges of each of the arms 18, said rear edges exert an upwardly and outwardly smearing or wiping action on the material under the blade, tending to force said material upwardly and outwardly along the sieve, thus tending to break up said material into fine particles and force the same through the meshes of the sieve. Any particles failing to pass through the sieve meshes are forced upwardly and outwardly until they pass over the upper rear extremity of the blade arm when they tend to fall of their own weight into the bottom of the sieve and again be subjected to the upward and outward smearing action of the blade arms.

The shaft 13 may be readily raised for the accommodation of the material to be strained and to permit the ready removal of the sieve. As the quantity of material in the sieve decreases the shaft and blades are forced downwardly to cause continuous pressure on the material contained.

The specific form and arrangement of parts is a simple and effective one for the purpose.

While I have illustrated and described the preferred form of construction for carrying the invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. A food strainer comprising a sieve member; and a rotatable blade co-operating therewith, said blade being arranged at an acute wedging angle to said sieve with its rear edge contacting with the sieve on a rearwardly receding curve.

2. A food strainer comprising a substantially hemispherical sieve member and a rotatable blade co-operating therewith, said blade being arranged at an acute wedging angle to said sieve with its rear edge contacting with the sieve on a rearwardly receding curve.

3. In combination, a base ring adapted to rest flat upon a table top or the like; an upstanding frame member consisting of a strip of metal bent into substantially inverted U-shape, with the lower ends of the same secured to the sides of said ring; an intermediate ring supported on and secured to said upstanding frame member; a sieve member detachably supported on said intermediate ring; a substantially U-shaped brace member secured to the sides of said upstanding frame member; a crank shaft mounted in the top of said upstanding frame member and in said brace; and a blade at the lower end of said crank shaft co-operating with said sieve.

4. A food strainer comprising a sieve-member; a spindle arranged substantially at the center of said sieve; and two oppositely disposed radiating blades on said spindle, each of said blades being arranged at an acute wedging angle to said sieve with its rear edge contacting with the sieve on an outwardly and rearwardly receding curve.

5. A food strainer comprising a substantially hemispherical sieve member; a spindle arranged substantially at the center thereof; and two oppositely disposed radiating blades on said spindle, each of said blades being arranged at an acute wedging angle to said sieve with its rear edge contacting with the sieve on an outwardly, upwardly and rearwardly receding curve.

In witness that I claim the foregoing as my invention, I affix my signature this 26 day of March, A. D. 1927.

RUSSELL H. CARPENTER.